US006560063B1

(12) United States Patent
Keffeler et al.

(10) Patent No.: US 6,560,063 B1
(45) Date of Patent: May 6, 2003

(54) TOP COVER FOR DISK DRIVE HAVING STIFFENING FEATURES AND GASKET CLEARANCE ENHANCEMENTS

(75) Inventors: Mike Keffeler, Longmont, CO (US); Matt Sandor, Boulder, CO (US)

(73) Assignee: Maxtor Corporation, Longmont, CO (US)

( * ) Notice: Subject to any disclaimer, the term of this patent is extended or adjusted under 35 U.S.C. 154(b) by 112 days.

(21) Appl. No.: 09/865,228

(22) Filed: May 24, 2001

Related U.S. Application Data

(60) Provisional application No. 60/239,134, filed on Oct. 10, 2000.

(51) Int. Cl.[7] ............................................. G11B 17/02
(52) U.S. Cl. ................................................... 360/97.01
(58) Field of Search ........................... 360/97.01–99.12; 369/75.1

(56) References Cited

U.S. PATENT DOCUMENTS

| | | | | |
|---|---|---|---|---|
| 4,725,904 A | * | 2/1988 | Dalziel ................. | 360/78.13 |
| 4,845,581 A | * | 7/1989 | Bronshvatch ........... | 360/98.01 |
| 5,301,075 A | * | 4/1994 | Takemoto ............... | 360/97.02 |
| 5,329,412 A | * | 7/1994 | Stefansky .............. | 360/97.01 |
| 5,422,766 A | * | 6/1995 | Hack et al. ............ | 360/97.02 |
| 5,454,157 A | | 10/1995 | Ananth et al. ......... | 29/603 |
| 5,488,523 A | | 1/1996 | Seaver et al. .......... | 360/99.12 |
| 5,546,250 A | | 8/1996 | Diel .................... | 360/97.02 |
| 5,598,306 A | * | 1/1997 | Frees et al. ........... | 360/97.02 |
| 5,703,734 A | * | 12/1997 | Berberich et al. ...... | 360/97.02 |
| 5,822,152 A | | 10/1998 | Seaver et al. .......... | 360/99.08 |
| 5,847,896 A | * | 12/1998 | Stefansky .............. | 360/78.12 |
| 6,011,670 A | * | 1/2000 | Balsley et al. ......... | 360/97.01 |
| 6,226,143 B1 | * | 5/2001 | Stefansky .............. | 360/97.01 |
| 6,411,463 B1 | * | 6/2002 | Janik et al. ........... | 360/97.01 |
| 6,429,999 B1 | * | 8/2002 | Dague et al. ........... | 360/97.01 |

* cited by examiner

Primary Examiner—Robert S. Tupper
(74) Attorney, Agent, or Firm—Sheridan Ross P.C.

(57) ABSTRACT

A computer disk drive top cover is provided with stiffening features and gasket clearance enhancements. In the preferred embodiment, the top cover includes a flange or skirt extending substantially perpendicular to the top cover, with one or more slots cut or formed on the flange. The flange provides increased bending strength to the top cover. The slots provide increased clearance for expansion of a compressible gasket used to seal the top cover to the base assembly of the disk drive housing. The slots are sized to provide expansion clearance along tangent points, or other critical clearance points on the base assembly.

32 Claims, 2 Drawing Sheets

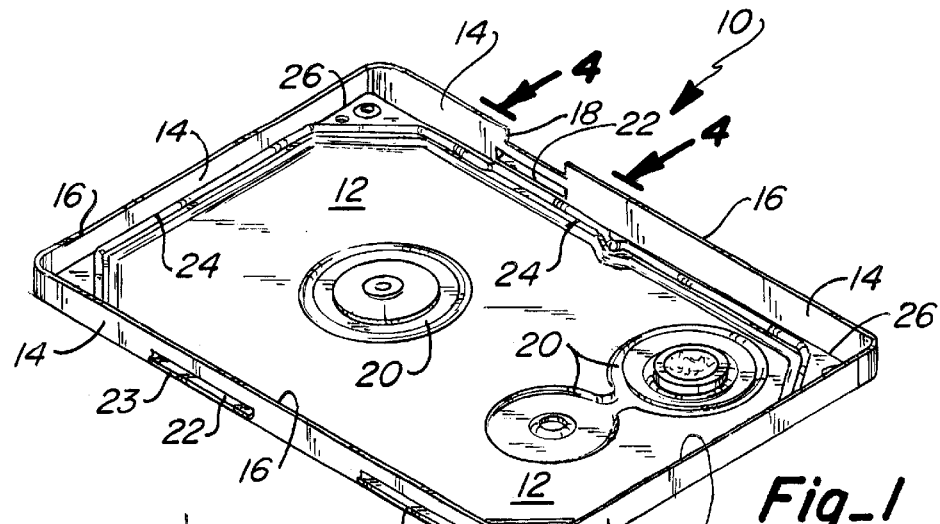
Fig_1
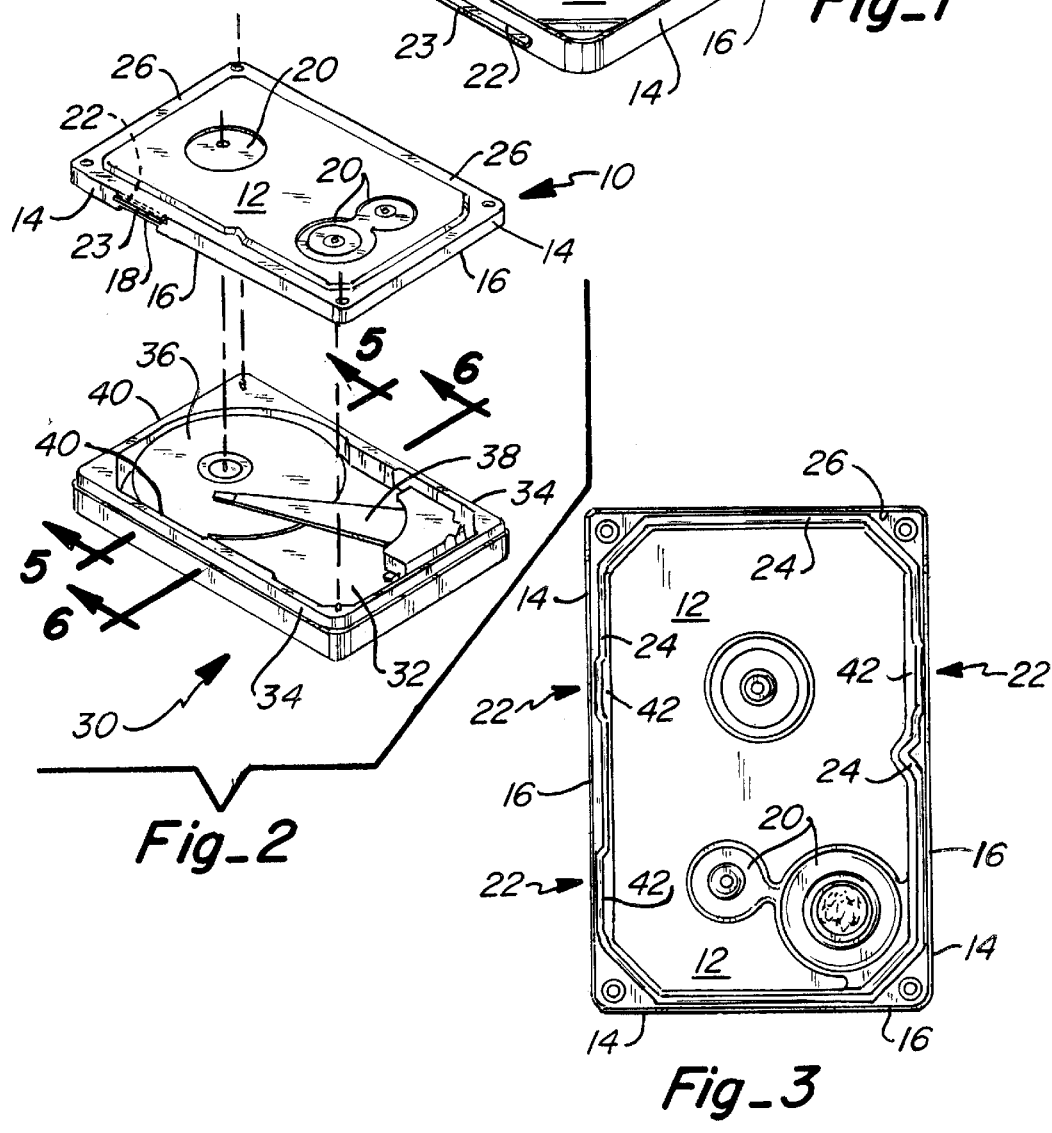
Fig_2
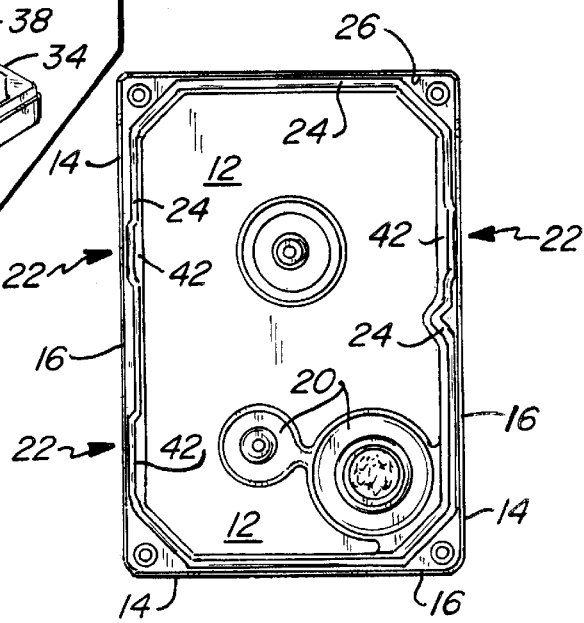
Fig_3

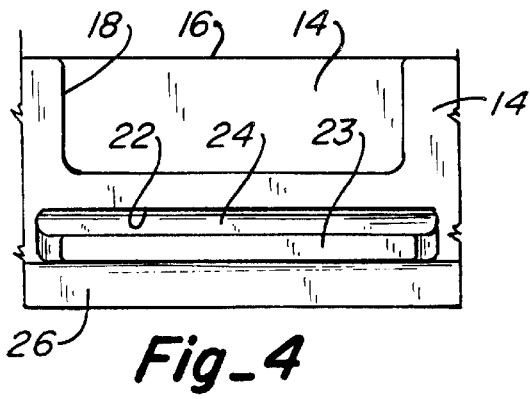
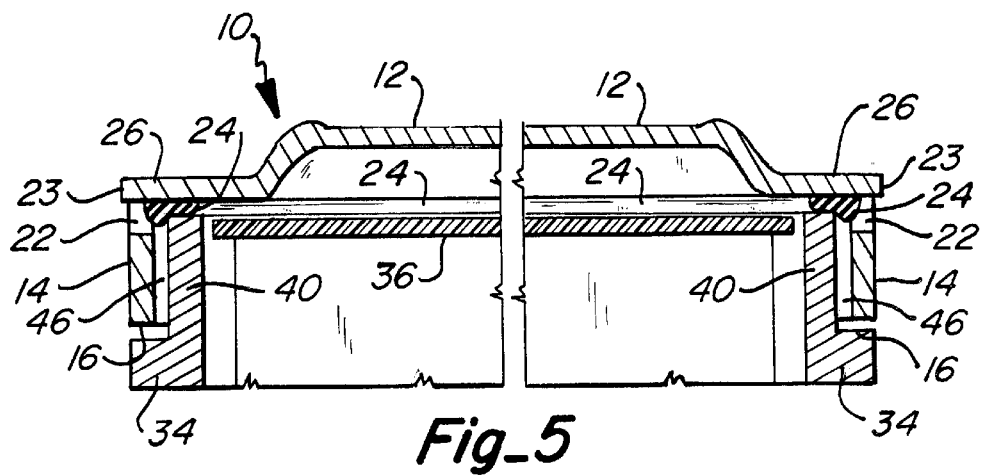
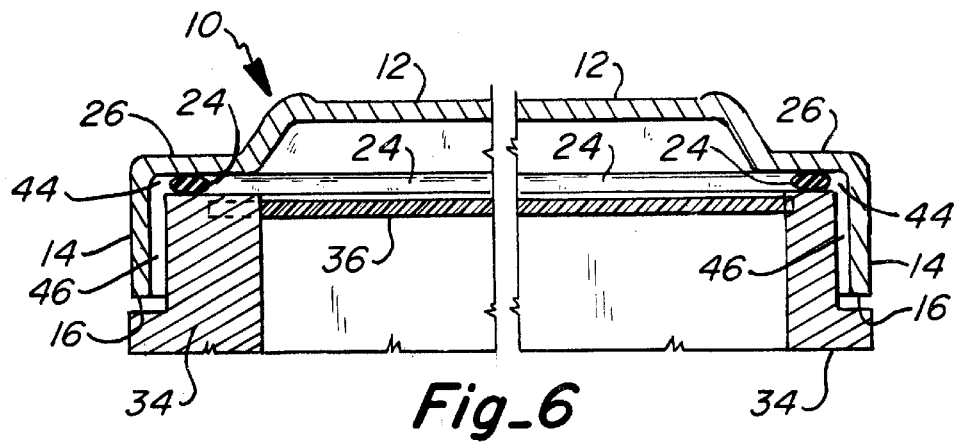

TOP COVER FOR DISK DRIVE HAVING STIFFENING FEATURES AND GASKET CLEARANCE ENHANCEMENTS

CROSS-REFERENCE TO RELATED APPLICATIONS

Priority is claimed from U.S. Provisional Patent Application No. 60/239,134, filed on Oct. 10, 2000 and entitled "FIPG ALLOWANCE/TOP COVER STIFFENING FEATURE," and further identified as Attorney Docket No. 3123-381-PROV, the disclosure of which is incorporated herein by reference in its entirety.

FIELD OF THE INVENTION

The present invention relates to computer disk drives, and more particularly, the present invention relates to a top cover for a housing of a computer disk drive, the top cover incorporating stiffening features and gasket clearance enhancements.

BACKGROUND OF THE INVENTION

Computer disk drives are precision electro mechanical devices which electronically store data and allow data to be manipulated in accordance with the functioning of a computing device in which the particular disk drive is installed. The components of a disk drive are found within a housing, typically constructed of a metal or metal alloy such as aluminum. The housing includes a top cover which is tightly sealed to the base assembly. In order to provide an adequate seal between the base assembly and the top cover, a compressible gasket is used as a sealing member. In order that the gasket be sufficiently compressed to seal the interior of the disk drive from the outside environment, a typical arrangement of at least six screws are used to secure the top cover to the base assembly. Because of the force required to sufficiently compress a sealing gasket, the top cover experiences certain deformation due to use of the screws. The top cover must have sufficient bending strength to prevent excessive top cover deformation which degrades the ability of the sealing gasket to seal the interior of the housing from the environment.

In order to minimize material and manufacturing costs, it is desirable to incorporate use of a top cover having a simple design, and a top cover requiring use of a minimum amount of material. Furthermore, it is advantageous to have a top cover which is adaptable for use with base assemblies which may be altered in their design to accommodate design changes in the components of the disk drive.

The present invention provides a top cover having a stiffening flange enhancing the bending strength of the top cover, and thus making it easier to seal the disk drive. The top cover also provides additional gasket clearance enabling the sealing gasket to more effectively seal those points along the base assembly of the housing which have narrowed thicknesses which are inherently more difficult to seal. Additionally, the arrangement of the gasket with respect to the top cover of the invention serves to create additional space within the base assembly which can be used to house disk drive components without having to change the dimensions of the base assembly. Each of these advantages is achieved with a simple top cover design minimizing material requirements.

These advantages along with others will become more apparent from the description which follows, taken in conjunction with the accompanying drawings.

SUMMARY OF THE INVENTION

In accordance with this invention, a top cover for a computer disk drive is provided. Although the invention is primarily characterized as an improvement to a top cover, the invention can also be regarded as an improvement to a computer disk drive housing, which includes the top cover. In its simplest form, the top cover comprises a substantially planar cover member which is sized to fit over the base assembly of the disk drive housing. The top cover further includes a flange or skirt which attaches to the cover member along its peripheral edge. At selected locations along the flange, one or more slots are formed creating openings which extend along desired lengths of the flange. The top cover is made of a unitary or single piece of material, and the flange along with others features of the top cover are formed by bending. The slots are located along the flange at those points where the sealing gasket requires additional room or clearance to expand when placed under compression.

By providing a continuous flange around the periphery of the top cover, the overall bending strength of the top cover is enhanced, thus reducing cover member deformation. By reducing this deformation or distortion, the top cover fits more uniformly over the base assembly, and fewer securing screws are required to compress the sealing gasket to provide an adequate seal. The slots are formed at selected locations along the flange of the top cover enabling the sealing gasket to expand at those locations which have minimal room for gasket clearance. At these points, the gasket can even be shifted or jogged from its normal linear pattern which also provides additional room or clearance within the base assembly to arrange components of the disk drive.

BRIEF DESCRIPTION OF THE DRAWINGS

FIG. 1 is a perspective view of a top cover of the invention;

FIG. 2 is a reduced perspective view of the top cover prior to mounting over a base assembly;

FIG. 3 is a plan view of the top cover;

FIG. 4 is a greatly enlarged fragmentary elevation taken along line 4—4 of FIG. 1;

FIG. 5 is a vertical section taken along line 5—5 of FIG. 2; and FIG. 6 is another vertical section taken along line 6—6 of FIG. 2.

DETAILED DESCRIPTION

FIG. 1 illustrates the top cover 10 of the invention, exposing the lower surface thereof. Specifically, the top cover 10 includes a substantially planar or flat cover member 12 and a skirt or flange 14 which is formed around the periphery of the top cover 10, and extends substantially perpendicular to the plane of the cover member 12. The lower edge 16 of flange 14 may extend uniformly around the flange 14. However, the lower edge 16 may have one or more cutout sections or gaps 18 which are required to accommodate corresponding protruding features of a base assembly 30. Cover member 12 may include one or more stamped details 20 which correspond to various components of the disk drive housed within the base assembly 30. One or more slots 22 are formed along the flange 14. As discussed in further detail below, these slots are placed at desired locations, and have lengths which accommodate those areas which must provide some expansion or relief for a sealing gasket 24 which is used to seal the top cover 10 to the base assembly 30.

The slots 22 may be formed in flange 14 by conventional means to include breaking the flange 14, and folding the excess material to a planar relationship with respect to cover member 12. Thus, a tab 23 is formed which slightly protrudes from the peripheral edge 26 of the top cover.

As seen in FIG. 2, the base assembly 30 includes a bottom portion or base plate 32, and upstanding base walls 34 forming a recess or compartment to house components of the disk drive. FIG. 2 also illustrates some of the components found within a disk drive to include a disk 36, and an actuator assembly 38. The base wall 34 has irregular shaped interior surfaces which conform to the shape of certain elements of the disk drive. For example, base wall 34 may have one or more tangent points 40 which are defined by those points along the base wall having a narrower thickness due to closely positioned elements of the disk drive. In the case of FIG. 2, the tangent points 40 define those areas along the base wall which have a narrow thickness due to the particular sized disk 36.

Now referring to FIG. 3, the sealing gasket 24 extends along an irregular pattern on the lower surface of the disk drive. For those areas on the flange 14 which include slots 22, the gasket 24 may jog or shift from its normal path along the lower surface of the top cover. These jogs or shifts are illustratively shown at points 42.

FIG. 4 illustrates a slot 22 and the gasket 24 which may expand into the opening created by the slot.

FIG. 5 illustrates the top cover after it has been secured to the base assembly 30, and the gasket 24 being compressed. As shown, the gasket 24 is allowed to expand into not only the small gap 46 between the interior surface of flange 14 and the exterior surface of base wall 34 at tangent point 40, but also into at least some portion of the opening created by slot 22. Without the use of slots 22, the gasket 24 would be confined to expansion within only the area or gap 46. Thus, greater compression force would be required to compress the gasket at these points, resulting in undesirable deformation of the top cover which causes the top cover to bend away from the base wall 34, further necessitating increased compression to seal the gasket 24. This increased compression requirement requires more securing screws, or other means to fasten the top cover to the base assembly. The gap 46 can be lesser or greater depending upon the desired fit between the top cover and base assembly. A smaller gap 46 provides even less room for gasket expansion, thus making use of the slots 32 even more important.

FIG. 6 illustrates representative areas along the base wall 34 which are thicker, and are not considered tangent points. The figure illustrates the top cover placed over the base assembly, but prior to compression of the gasket 24. As shown, the gasket has less room to expand towards the flange 14, but has additional room to expand interiorly without contacting elements of the disk drive. Specifically, the expansion area 44 represents that area which the gasket 24 may expand. A comparison of expansion area 44 in comparison to the expansion area provided by slot 22 clearly illustrates the additional expansion room provided by slot 22. The expansion area 44 also defines the bend radius of the flange 14 with respect to the peripheral edge 26. Accordingly, the limit of expansion for gasket 24 along non-tangent points such as illustrated in FIG. 6 is limited transversely or in the horizontal plane by the bend radius.

By providing slots 22, not only is the expansion area increased for gasket 24, but, as shown in FIG. 3, the sealing gasket 24 can actually jog or shift from its normal linear path. Therefore, the gasket 24 allows the base wall 34 to be at a minimum thickness which, in turn, allows for greater room or space within the base assembly 30 to arrange disk drive components.

Although slots 22 may somewhat decrease the bending strength of the top cover, the width of the slots 22 is not great enough to substantially effect the bending strength because a considerable portion of the flange 14 extends below the slots 22.

The top cover of this invention provides increased stiffness which enhances the ability for the compressible gasket to effectively seal the top cover with minimum compression requirements. Reduced compression requirements reduce the number of screws or fasteners which must be used to secure the top cover and also reduces deformation problems with the top cover which further insures that the sealing gasket traverses uniformly and symmetrically along the base wall of the base assembly. Slots selectively formed on the flange of the top cover at corresponding tangent points further insures that the gasket is uniformly compressed without increasing compression requirements, yet still allows the gasket to perform its sealing function. Additionally, the gasket can be moved or jogged away from its normal path which in turn creates additional available space within the chamber of the base assembly for arrangement of disk drive components.

It shall be understood that the particular dimension of the flange can be modified to accommodate the particular stiffness requirements for the top cover. Additionally, it shall be understood that the slots can be a varying lengths and widths to accommodate the corresponding tangent points, or other irregularities encountered with respect to the thickness and shape of the base wall. Furthermore, it shall be understood that the gap 46 is not a critical feature which must be incorporated in terms of the fit between the top cover and base assembly, and the gap 46 could be substantially eliminated if desired.

The extent to which the gasket 24 expands is a function of the particular gasket material selected, and the force used to compress the gasket. FIG. 5 illustrates the preferred embodiment wherein the gasket material compresses in a manner so that an adequate seal is still created between the top cover and base assembly, and the gasket compresses taking advantage of the space or room available within slot 22. The particular dimension of the top cover and the exact placement of the gasket along the lower surface of the top cover can be modified so that the gasket expands into available space to include gap 46 and slot 22. However, it shall also be understood that gap 46 could be substantially eliminated and slot 22 could constitute the only open area in which the gasket could expand in the peripheral or exterior direction. Alternatively, with or without gap 46, the gasket 24 can expand either into the bend radius, or into the bend radius and the slot 22.

This invention has been described with respect to a preferred embodiment; however, it shall be understood that various other modifications can be made within the spirit and scope of the invention.

What is claimed is:

1. A top cover especially adapted for covering a base of a disk drive housing, said top cover comprising:
   a substantially planar cover member having upper and lower surfaces, and a peripheral edge;
   a flange connected to said cover member and extending substantially perpendicular thereto, said flange including at least one slot formed thereon creating an opening in said flange and adjacent said lower surface of said cover member; and a gasket attached to said lower surface of said cover member, said gasket traversing said lower surface adjacent said peripheral edge, said gasket being compressed to extend adjacent said opening when said cover member is secured to the base of the disk drive.

2. A top cover, as claimed in claim 1, wherein:
said gasket is compressed to extend adjacent and into at least a portion of said opening when said cover member is secured to the base.

3. A top cover, as claimed in claim 1, wherein:
said at least one slot comprises a plurality of slots formed along said flange, said slots being selectively spaced from one another along said flange.

4. A top cover, as claimed in claim 1, wherein:
said flange has a lower portion, and said lower portion extends continuously below said at least one slot.

5. A top cover, as claimed in claim 1, wherein:
said gasket traverses linearly along said lower surface adjacent said peripheral edge, and said gasket shifts in its traverse outwardly towards said flange of said cover member along points directly adjacent said opening.

6. A top cover, as claimed in claim 1, wherein:
said opening has a substantially uniform width.

7. A top cover, as claimed in claim 1, wherein:
said cover member has a shape which remains undeformed after said top cover is secured to said base, said gasket being compressed to extend an amount in said opening to compensate for increased force which would otherwise deform said cover member.

8. A top cover, as claimed in claim 1, wherein:
said flange has an interior surface, and said base has an exterior surface facing said interior surface, a gap being defined by space between said interior surface and said exterior surface, said gap communicating with said opening, and said gasket being compressed to extend into said opening and into said gap.

9. A computer disk drive housing comprising:
a base assembly including a base plate, and a base wall extending substantially perpendicular to said base plate, said base assembly housing components of the disk drive;
a top cover having upper and lower surfaces, and a flange connected to said top cover and extending substantially perpendicular thereto, said flange including a slot formed thereon creating an opening adjacent said lower surface of said top cover, said top cover being placed over said base assembly so that said flange extends exteriorly of said base wall of said base assembly; and
a gasket attached to and traversing along said lower surface of said top cover, said gasket being compressed to extend adjacent said opening when said top cover is secured to the base assembly of the disk drive.

10. A housing, as claimed in claim 9, wherein:
said gasket is compressed to extend adjacent and into at least a portion of said opening when said top cover is secured to the base assembly.

11. A housing, as claimed in claim 9, wherein:
said at least one slot comprises a plurality of slots formed along said flange, said slots being selectively spaced from one another along said flange.

12. A housing, as claimed in claim 9, wherein:
said flange has a lower portion, and said lower portion extends continuously below said at least one slot.

13. A housing, as claimed in claim 9, wherein:
said base wall includes at least one tangent point defining a portion of said base wall having a narrowed thickness, said gasket being compressed between said portion of said wall and said lower surface of said top cover, and said gasket further extending into at least some portion of said opening.

14. A method of assembling a top cover to a base of a disk drive housing, said method comprising the steps of:
providing a substantially planar top cover including a peripheral flange, said flange including a slot formed thereon creating an opening in said flange;
applying a gasket material to a lower surface of the top cover, said gasket material being placed adjacent the flange;
placing the top cover over the base;
applying force to compress the gasket material allowing the gasket material to extend at least partially into the opening created by the slot.

15. A method, as claimed in claim 14, further including the step of:
providing a plurality of slots spaced from one another along said flange.

16. A method, as claimed in claim 14, further including the step of:
applying the gasket material in a pattern comprising a linear portion extending along said lower surface of said top cover, and a shifted portion extending along said lower surface of said top cover closer in proximity to said opening to compensate for tangent points of the base.

17. A method, as claimed in claim 14, wherein:
the steps of the method are performed in the sequence set forth in the claim.

18. A method, as claimed in claim 14, wherein:
the placing step and the second applying step are performed substantially simultaneously.

19. A method, as claimed in claim 14, wherein:
the slot comprises a plurality of slots formed along the flange, the plurality of slots being selectively spaced from one another along the flange.

20. A method, as claimed in claim 14, wherein:
the flange has a lower portion, and the lower portion extends continuously below the slot.

21. A method, as claimed in claim 14, further comprising the step of:
compressing the gasket material causing the gasket material to extend selected amounts into the opening to accommodate desired clearance within the base.

22. A method, as claimed in claim 14, wherein:
the base includes a base wall, and at least one tangent point on the base wall defining a portion of the base wall having a narrowed thickness, the gasket material being compressed between the portion of the base wall and the lower surface of the top cover to extend into at least some portion of the opening.

23. A top cover especially adapted for covering abase of a disk drive housing, said top cover comprising:
a cover member having upper and lower surfaces, and a peripheral edge;
means connected along said peripheral edge for stiffening said cover member, said means for stiffening including at least one opening formed therethrough; and
a gasket attached to said lower surface of said cover member, said gasket traversing along said peripheral edge and said gasket being compressed to extend adjacent said opening when said cover member is secured to the base of the disk drive.

24. A top cover, as claimed in claim 23, wherein:

said gasket is compressed to extend adjacent and into at least a portion of said opening when said cover member is secured to the base.

25. A top cover, as claimed in claim 23, wherein:

said at least one opening comprises a plurality of openings formed along said means for stiffening, said openings being selectively spaced from one another along said means for stiffening.

26. A top cover, as claimed in claim 23, wherein:

said means for stiffening has a lower portion, and said lower portion extends continuously below said opening.

27. A top cover, as claimed in claim 23, wherein:

said means for stiffening covers at least one tangent point on a base wall of the disk drive housing, said gasket being compressed between said base wall and said lower surface of said cover member, and said gasket further extending into at least some portion of said at least one opening.

28. A computer disk drive housing comprising:

a base assembly including a base plate and a base wall extending substantially perpendicular to said base plate, said base assembly for housing components of the disk drive;

a cover member having upper and lower surfaces, and a peripheral edge;

means connected along said peripheral edge for stiffening said cover member, said means for stiffening including at least one opening formed therethrough; and a gasket attached to said lower surface of said cover member, said gasket traversing along said peripheral edge and said gasket being compressed to extend adjacent said opening when said cover member is secured to the base assembly housing of the disk drive.

29. A housing, as claimed in claim 28, wherein:

said gasket is compressed to extend adjacent and into at least a portion of said opening when said cover member is secured to the base assembly.

30. A housing, as claimed in claim 28, wherein:

said at least one opening comprises a plurality of openings formed along said means for stiffening, said openings being selectively spaced from one another along said means for stiffening.

31. A housing, as claimed in claim 28, wherein:

said means for stiffening has a lower portion, and said means for stiffening extends continuously below said at least one opening.

32. A housing, as claimed in claim 28, wherein:

said base wall includes at least one tangent point defining a portion of said base wall having a narrowed thickness, said gasket being compressed between said portion of said base wall and said lower surface, and said gasket further extending into at least some portion of said at least one opening.

* * * * *

UNITED STATES PATENT AND TRADEMARK OFFICE
CERTIFICATE OF CORRECTION

PATENT NO.    : 6,560,063 B1
DATED         : May 6, 2003
INVENTOR(S)   : Keffeler et al.

It is certified that error appears in the above-identified patent and that said Letters Patent is hereby corrected as shown below:

Column 6,
Line 54, please insert a space between "a" and "base".

Signed and Sealed this

First Day of July, 2003

JAMES E. ROGAN
*Director of the United States Patent and Trademark Office*